United States Patent [19]

Tanaka et al.

[11] 4,205,640
[45] Jun. 3, 1980

[54] INTAKE MIXTURE HEATING DEVICE FOR INTERNAL COMBUSTION ENGINE

[75] Inventors: Minoru Tanaka, Choufu; Ikuo Kajitani, Niiza, both of Japan

[73] Assignee: Honda Giken Kogyo Kabushiki Kaisha, Tokyo, Japan

[21] Appl. No.: 847,242

[22] Filed: Oct. 31, 1977

[30] Foreign Application Priority Data

Nov. 5, 1976 [JP] Japan .................................. 51/132384

[51] Int. Cl.² ............................................. F02M 31/00
[52] U.S. Cl. ........................ 123/122 AB; 123/122 AC; 261/144
[58] Field of Search ............... 123/122 AB, 122 AC, 123/52 M, 32 ST, 127, 32 SP; 261/144, 145

[56] References Cited

U.S. PATENT DOCUMENTS 3,908,620  9/1975  Maekawa ........................ 123/122 AB
3,965,881  6/1976  Sakurai ........................... 123/122 AB
4,086,892  5/1978  Marsee ........................... 123/122 AB

FOREIGN PATENT DOCUMENTS 984249   2/1976  Canada ............................ 123/122 AB
1439833  6/1976  United Kingdom ............... 123/122 AB Primary Examiner—Ronald H. Lazarus
Attorney, Agent, or Firm—Lyon & Lyon

[57] ABSTRACT

An intake manifold for a multi-cylinder internal combustion engine contains main intake passages leading from a main distribution chamber for supplying lean mixture to each cylinder. The intake manifold also has auxiliary intake passages leading from an auxiliary distribution chamber for supplying a rich mixture to each cylinder. Engine coolant is circulated through the intake manifold to act as heating means for the rich mixture and for part of the lean mixture. Another part of the lean mixture is not heated.

3 Claims, 3 Drawing Figures

INTAKE MIXTURE HEATING DEVICE FOR INTERNAL COMBUSTION ENGINE

This invention relates to internal combustion multi-cylinder engines, each cylinder having a main combustion chamber and an auxiliary combustion chamber connected by means of a torch opening. Rich mixture is supplied to the auxiliary chambers and lean mixture is supplied to the main chambers. After compression, spark ignition of the mixture in each auxiliary chamber causes a torch flame to project through the torch opening and ignite the lean mixture in the associated main chamber.

Heating of the rich mixture for the auxiliary combustion chambers and heating of the main primary portion of the lean mixture for the main combustion chambers is accomplished by circulating engine coolant through passageways in the intake manifold. Heating of the mixtures insures complete vaporization and prevents the formation of unwanted fuel droplets on the walls of the various intake passageways.

It has been proposed heretofore to accomplish heating of the rich mixture and a portion of the lean mixture by using the heat of the exhaust gases for this purpose. However, in engines of the type described in which each main combustion chamber is connected by way of a torch opening to an auxiliary combustion chamber, respectively, it is highly desirable to maintain the exhaust gases at a relatively high temperature for a relatively long time interval for the purpose of reducing the amount of unwanted pollutants discharged into the atmosphere. As a result of performing no exhaust heating, the reaction efficiency in the exhaust manifold is improved. It is important that the flow of hot liquid (coolant) in heat exchange with the intake mixtures have improved flow and good heat exchange characteristics in order to counteract the somewhat unsatisfactory warmup performance of the engine when it is cold.

Other and more detailed objects and advantages will appear hereinafter.

Figure 1:
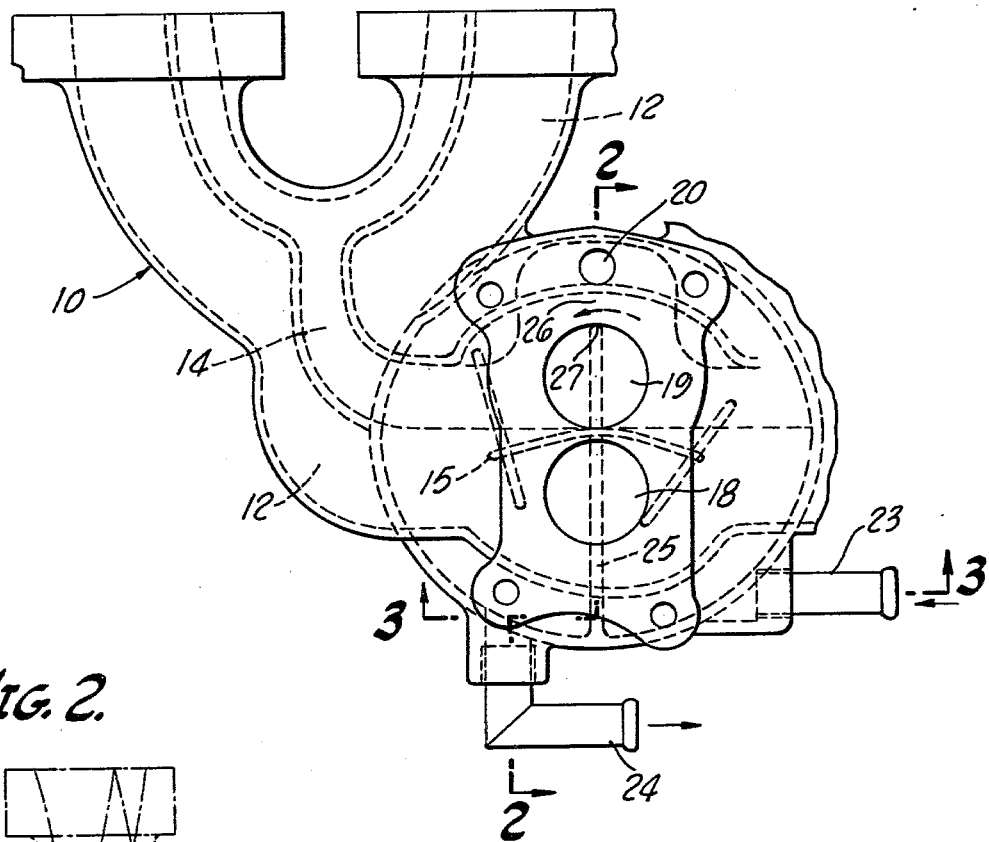
FIG. 1 is a plan view partly broken away showing a preferred embodiment of this invention.
Figure 2:
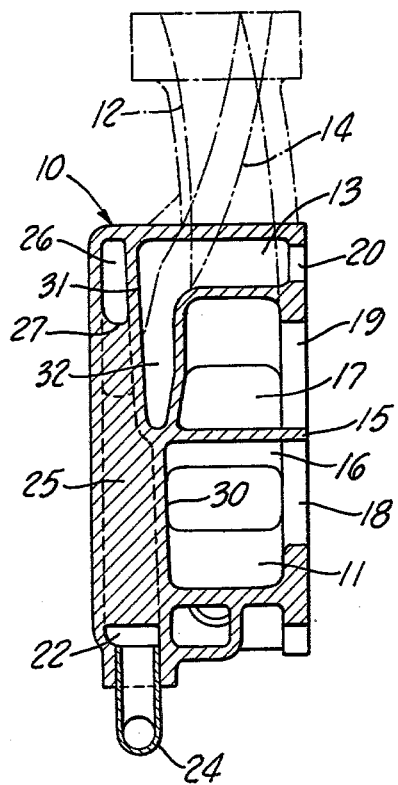
FIG. 2 is a sectional elevation taken substantially on the lines 2—2 as shown in FIG. 1.
Figure 3:
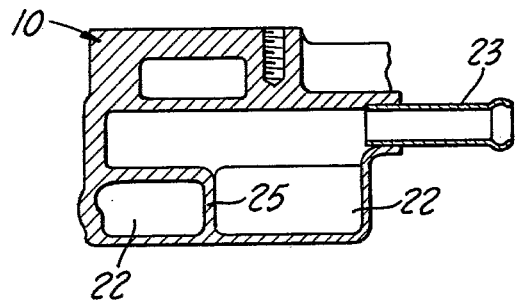
FIG. 3 is a sectional detail taken substantially on the lines 3—3 as shown in FIG. 1.

Referring to the drawings, the intake manifold generally designated 10 is provided with walls forming a main distribution chamber 11. Main intake passages 12 lead from said main distribution chamber 11 for supplying a lean mxture to each of the cylinders of the engine. The intake manifold 10 also has walls forming an auxiliary chamber 13. Auxiliary intake passages 14 lead from said auxiliary distribution chamber 13 for supplying a rich mixture to each of the cylinders of the engine.

A wall 15 of the intake manifold 10 divides the main distribution chamber 11 into a first sub-chamber 16 and a second sub-chamber 17. An intake port 18 communicates with the first sub-chamber 16 and serves to supply lean mixture from the main primary barrel of a carburetor, now shown. An intake port 19 communicates with the second sub-chamber 17 and serves to supply lean mixture from a main secondary barrel of the carburetor when the engine is operating under load. An intake port 20 communicates with the auxiliary distribution chamber 13.

While it is highly desirable to heat the rich mixture in the auxiliary distribution chamber 13 and the lean mixture in the first sub-chamber 16 in order to insure vaporization and prevent formation of unwanted liquid fuel droplets, it is not desirable to heat the lean mixture in the second sub-chamber 17. This sub-chamber 17 becomes active only when the secondary barrel of the carburetor opens when the engine is under load. The lean mixture in the second sub-chamber 17 mixes with heated lean mixture from the first sub-chamber 16, and sufficient heat is present to insure vaporization of all of the lean mixture being supplied to the engine cylinders. Moreover, volumetric efficiency is improved when the engine is operating under load by not heating the lean mixture in the second sub-chamber 17.

The heating chamber 22 within the intake manifold 10 is heated by liquid coolant from the engine entering through inlet fitting 23 and leaving through discharge fitting 24. A central wall 25 divides the heating chamber 22 into two parts joined by clearance space 26 adjacent the end 27 of the wall 25 and extending near the bottom of the auxiliary distribution chamber 13. Accordingly, liquid coolant flows into the chamber 22 from fitting 23, passes around the dividing wall 25 in a counterclockwise direction, as viewed in FIG. 1. The entire liquid coolant then passes through the gap 26 at the end 27 of the wall 25 and continues in a counterclockwise direction through the heating chamber 22, and discharging through the fitting 24. The dividing wall 25 is necessary to maintain the liquid coolant passing through the heating chamber 22 for a relatively long time for heating sufficiently both the lean and rich mixtures, and it is possible particularly to heat the rich mixture sufficiently by means of the entire liquid coolant passing through the gap 26 below the auxiliary distribution chamber 13.

The wall 30 separates the heating chamber 22 from the first sub-chamber 16 and acts to transmit heat from the engine coolant to the lean mixture in the first sub-chamber 16. The wall 31 divides the heating chamber 22 from the auxiliary distribution chamber 13 and serves to transmit heat into the rich mixture. A portion 32 of the auxiliary distribution chamber 13 is positioned between the heating chamber 22 and the second sub-chamber 17 so that the heating chamber 22 and second sub-chamber 17 do not have a common wall separating them. In this way, heating of the lean mixture in the second sub-chamber 17 is minimized.

Having fully described our invention, it is to be understood that we are not to be limited to the details herein set forth but that our invention is of the full scope of the appended claims.

We claim:

1. An intake manifold for an internal combustion multi-cylinder engine, comprising, in combination: walls forming a main distribution chamber, main intake passages leading from said main distribution chamber for supplying lean mixture to each of the cylinders of the engine, walls forming an auxiliary distribution chamber, auxiliary intake passages leading from said auxiliary distribution chamber for supplying a rich mixture to each of the cylinders of the engine, said main distribution chamber being divided by wall means to form a first sub-chamber and a second sub-chamber, walls forming a heating chamber below the main and auxiliary distribution chamber, means for circulating coolant from the engine through said heating chamber, a bottom wall of the auxiliary distribution chamber amd a bottom wall of said first sub-chamber being in direct contact with said heating chamber for rapid transfer of heat into the auxiliary distribution chamber and said first sub-chamber, a portion of the auxiliary distribution chamber being interposed between the heating chamber and said second sub-chamber to limit transfer of heat into the second sub-chamber.

2. An intake manifold for an internal combustion multi-cylinder engine, comprising in combination: walls forming a main distribution chamber, main intake passages leading from said main distribution chamber for supplying lean mixtures to each of the cylinders of the engine, walls forming an auxiliary distribution chamber, auxiliary intake passages leading from said auxiliary distribution chamber for supplying a rich mixture to each of the cylinders of the engine, said main distribution chamber being divided by wall means to form a first sub-chamber and a second sub-chamber, walls forming a heating chamber, a divider wall in said heating chamber, means for circulating coolant from the engine through said heating chamber from one side of the divider wall to the other and around an end thereof, the walls of the auxiliary distribution chamber and the walls of said first sub-chamber being in direct contact with said heating chamber for rapid transfer of heat into the auxiliary distribution chamber and said first sub-chamber, a portion of the auxiliary distribution chamber being interposed between the heating chamber and said second sub-chamber to minimize transfer of heat into the second sub-chamber.

3. An intake manifold for an internal combustion multi-cylinder engine, comprising, in combination: walls forming a main distribution chamber, main intake passages leading from said main distribution chamber for supplying lean mixture to each of the cylinders of the engine, walls forming an auxiliary distribution chamber, auxiliary intake passages leading from said auxiliary distribution chamber for supplying a rich mixture to each of the cylinders of the engine, said main distribution chamber being divided by wall means to form a first sub-chamber and a second sub-chamber, walls forming a heating chamber, a bottom wall of the heating chamber being spaced horizontally below a bottom wall of said distribution chambers, said distribution chambers having a top wall, means for circulating coolant from the engine through said heating chamber, a first opening in said top wall communicating with said first sub-chamber, a second opening in said top wall communicating with said second sub-chamber, a third opening in said top wall communicating with said auxiliary distribution chamber, a bottom wall of the auxiliary distribution chamber and a bottom wall of said first sub-chamber being in direct contact with said heating chamber for rapid transfer of heat into the auxiliary distribution chamber and said first sub-chamber, and the bottom wall of the second sub-chamber being spaced from the auxiliary distribution chamber to limit transfer of heat into the second sub-chamber.

* * * * *